United States Patent
Gumbel et al.

(10) Patent No.: US 7,956,732 B2
(45) Date of Patent: Jun. 7, 2011

(54) VEHICLE HAZARD FLASHER CONTROL SYSTEM

(75) Inventors: Matthew J. Gumbel, Fort Wayne, IN (US); Joseph A. Bell, La Porte City, IA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 381 days.

(21) Appl. No.: 11/872,250

(22) Filed: Oct. 15, 2007

(65) Prior Publication Data

US 2009/0096601 A1    Apr. 16, 2009

(51) Int. Cl.
*B60Q 1/52* (2006.01)
(52) U.S. Cl. ......................... 340/471; 362/227
(58) Field of Classification Search .................. 340/471, 340/472, 475, 468, 477, 478; 362/227, 236, 362/543
See application file for complete search history.

(56) References Cited

U.S. PATENT DOCUMENTS

| | | | |
|---|---|---|---|
| 5,499,009 A | 3/1996 | Davis | |
| 5,659,289 A * | 8/1997 | Zonkoski et al. | 340/438 |
| 5,663,705 A | 9/1997 | Pretorius et al. | |
| 5,680,098 A * | 10/1997 | Bejster et al. | 340/458 |
| 5,914,651 A | 6/1999 | Smalls | |
| 6,717,366 B1 * | 4/2004 | Maruyama | 315/82 |
| RE38,795 E * | 9/2005 | Welling et al. | 340/691.1 |
| 7,463,139 B2 * | 12/2008 | Burlak et al. | 340/468 |
| 2005/0007246 A1 | 1/2005 | Yen et al. | |
| 2006/0091817 A1 * | 5/2006 | Herrig et al. | 315/200 A |
| 2007/0194905 A1 * | 8/2007 | Herrig et al. | 340/471 |

* cited by examiner

*Primary Examiner* — George A Bugg
*Assistant Examiner* — Edny Labbees
(74) *Attorney, Agent, or Firm* — Jeffrey P. Calfa; Mark C. Bach; Gerald W. Askew

(57) ABSTRACT

A vehicle flasher hazard function is implemented on an electrical controller having control over vehicle exterior lights. The flasher hazard function features an optimized duty cycle and operational frequency, consistent with legal requirements for the flasher rate. The point in time that individual bulbs are turned on is staggered in time to avoid all bulbs being simultaneously activated. This distributes the current surges associated with bulb activation being distributed in time. When a vehicle battery can no longer sustain the legally mandated flasher rate an optional path for flasher operation at a reduced rate is provided.

9 Claims, 5 Drawing Sheets

VEHICLE HAZARD FLASHER CONTROL SYSTEM

BACKGROUND OF THE INVENTION

1. Technical Field

The present invention relates generally to motor vehicles and more particularly to a system for cycling vehicle lamps on and off during flasher operation to minimize current draw or to extend component service life.

2. Description of the Problem

The hazard flashing function of vehicle tail and parking lamps (four-way flashers) is done to mark a highway hazard to other drivers when a vehicle, or its operator, is disabled. Often these vehicles may sit for hours or days with the four-way flashers on. Over time, with the vehicle engine off, the current draw on the battery from the hazard flashers reduces the battery current to the point that the four-way flashers fail. Under these conditions passing motorists may not see the hazard, especially at night.

Vehicle battery charge conservation under the condition of four-way flasher operation has been addressed in some prior art references by intermittent activation of the flashers. Motion or headlight detection devices have installed on cars to activate the four-way flashers upon approach of a vehicle. To the best knowledge of the present inventors, alternative approaches to extending battery life involving manipulation of the flasher duty cycle and cycle rate to minimize current draw have not been attempted. Currently, operation of vehicle marker lights in a hazard warning or four-way flasher mode draws the same current regardless of the operational state of the vehicle. Hazard light duty cycles and operational rate remain the same with engine running, and capable of generating electricity, as they do with the engine off and hazard light operation being maintained on battery power alone. However, optimizing the hazard flasher operation to minimize current draw may affect the duty life of components such as bulbs, relays and mechanical flashers on vehicles so equipped.

SUMMARY OF THE INVENTION

According to the invention a vehicle hazard flasher function is provided having an optimized duty cycle and an optimized operational frequency, consistent with legal requirements for flasher rate and with a vehicle's situation. Where a vehicle battery can no longer sustain the legally mandated flasher rate an optional operational mode for flasher operation at a reduced frequency is provided.

In a motor vehicle equipped with an electronic control unit and a plurality of exterior marker lights, including lights used for signaling turns and braking, the electronic control unit provides activation signals for switching the exterior marker lights on and off. Each exterior marker light is individually switched. A hazard flasher operation of a set of the exterior marker lights is provided in which the exterior marker lights appear to an observer to flash on and off concurrently with a frequency in a range around 1 Hz. The hazard flasher function is characterized by a duty cycle, which is the duration of the period an individual exterior marker light is on within a cycle and the operating frequency.

The duty cycle and frequency of the hazard flasher function are adjusted in the present invention in response to vehicle condition in order to protect component service life and to minimize the peak current draw on the battery. Activation signals for the exterior marker lights are staggered so that initial current surges associated with the bulbs being turned on are not concurrent. This can be done by delaying the activation of successive bulbs slightly, so long as the delay is not apparent to an outside observer. Current surges can be reduced by varying the duty cycle, or the flasher function frequency, to avoid excessive cool down of the bulbs during an on/off cycle. This extends bulb service life by reducing mechanical stress on the bulb filaments. The system can be made responsive to whether the engine is running, and supplying electricity, or off, in determining whether to operate the flashers to maximize component service life or to promote longest possible operation of the flashers where operation must be sustained from battery power alone. Under circumstances where the engine is off and battery charge has declined to the point where it cannot sustain operation of the flasher function at legally mandated levels, the system can be programmed to reduce the hazard function frequency to allow respite to the battery and thereby allow the battery to recover to supply enough current to visibly illuminate the exterior marker lights.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
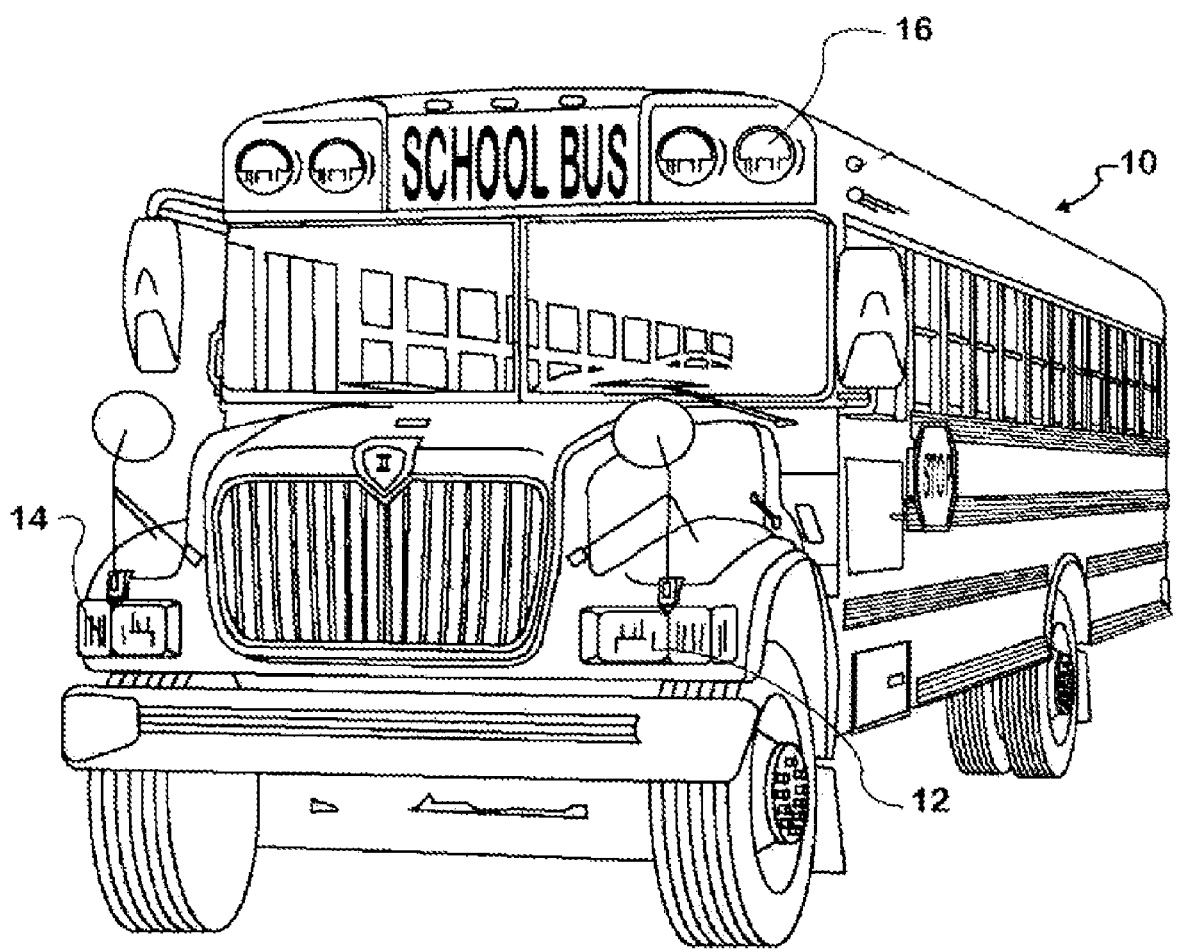
FIG. 1 is a perspective view of a school bus equipped with lighting systems with which the present invention is advantageously employed.

Referring to the drawings and in particular referring to FIG. 1 a vehicle 10 is shown. An assortment of exterior marker lights are mounted to the exterior of vehicle 10, including, but not limited to, left front signal 12, right front turn signal 14 and front pupil warning lights 16.

Figure 2:
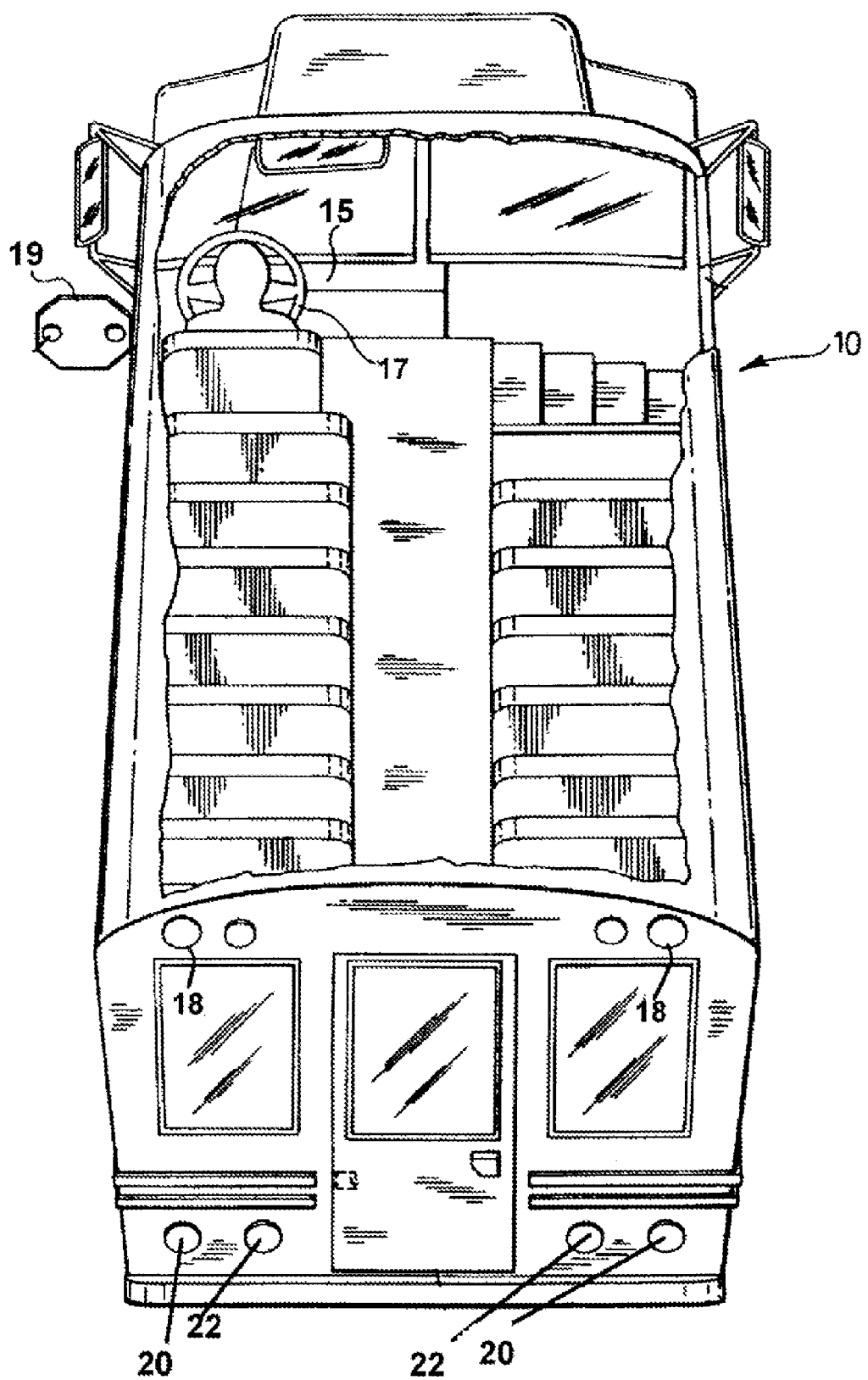
FIG. 2 is a rear view of the school bus of FIG. 1.

Referring to FIG. 2, an instrument panel 15 is positioned at a driver's station 17 in the interior of vehicle 10. Manual activation of a hazard flasher function using a set of the exterior marker lights is typically done from the driver station 17 using a push button switch on the instrument panel 15. Additional exterior marker lights are visible in the figure including sign pupil warning lights 19, rear pupil warning lights 18 and left and right rear turn signal lights 20 and rear brake lights 22.

Figure 3:
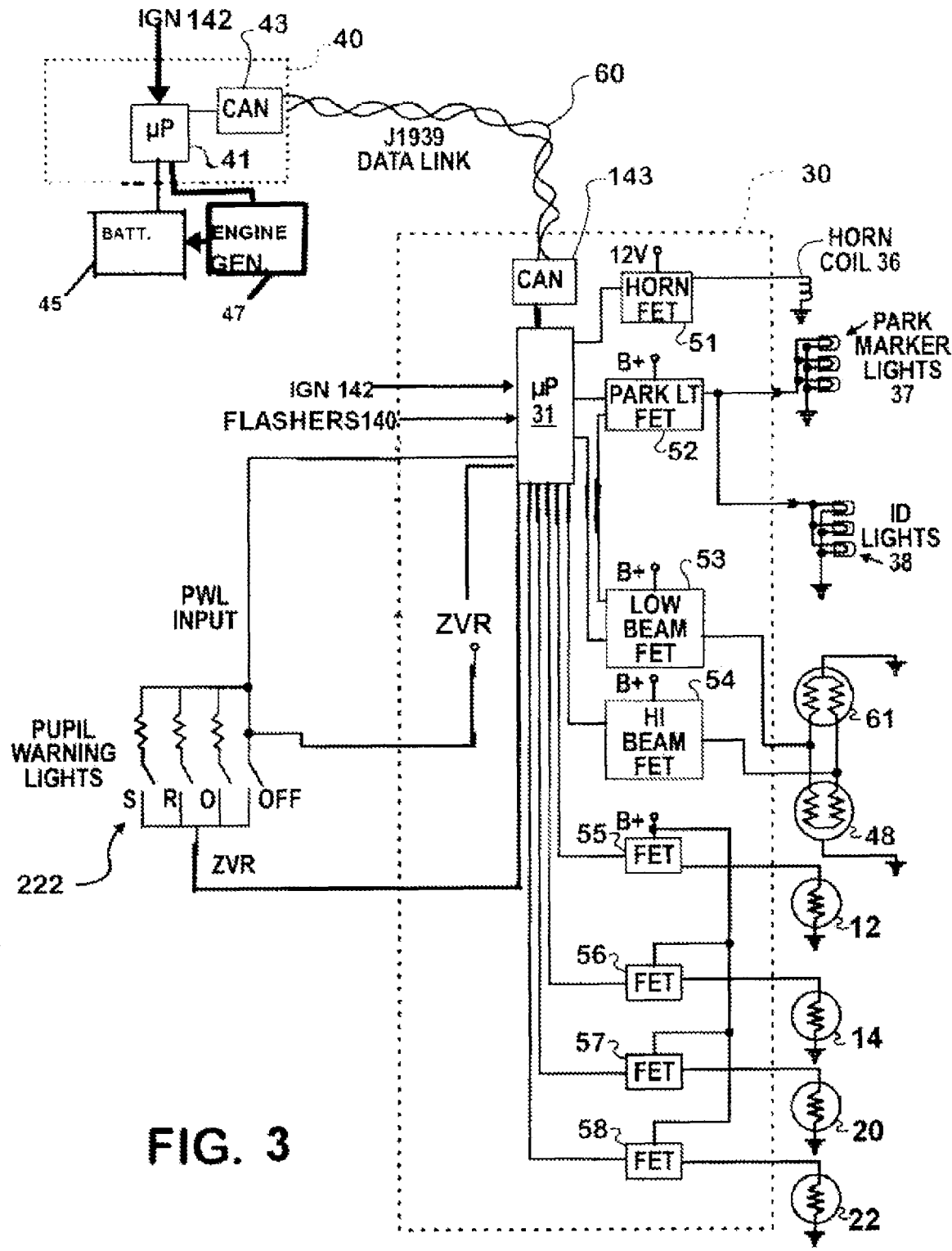
FIG. 3 is a mixed circuit schematic and block diagram of a vehicle lighting and lighting control system.

FIG. 3 illustrates an electrical control system for a vehicle which provides lighting system control primarily through one element of that system, an electrical system controller (ESC) 30 with its associated input and output connections. ESC 30 is a high level controller used in a vehicle controller area network, only a stump representation of which is provided, but which includes a data link 60 and other controllers which communicate with ESC 30 over the data link such as an engine controller 40. ESC 30 provides direct control over most vehicle exterior lamps including, by group: the low beam headlight filaments 61; the high beam headlight filaments 48; the parking marker lights 37; ID lights 38; the pupil warning lights (not shown); the left front turn signals 12; the right front turn signals 14; the right rear turn signals 20; and the left rear turn signals 22; etc. ESC 30 receives an ignition input signal 142 either directly or over the controller area network bus 60 from a gauge controller (not shown). Additional outputs may be controlled directly from the ESC 30, such as a horn coil 36. The horn coil 36, and the park marker lights 37, ID lights 38, low beam filaments 61, high beam filaments 48 and the turn signal lights 12, 14, 20, 22 are all powered by switching field effect transistors 51-58, which are incorporated in the ESC 30, and which provide control over each element individually. It will be understood that in some applications these switching functions may be implemented by relays which are not incorporated in the ESC 30, or a controller providing equivalent control over the vehicle exterior lights.

Execution of programming on ESC 30 is carried out by a microprocessor 31. The hazard flasher function is effected by appropriate programming which operates in part responsive to input signals received by ESC 30 over datalink 60 through a controller area network interface 143, or directly from input switches connected to the ESC, including a set of pupil warning light control switches 222 (an example of a multiplexed analog input where ZVR stands for Zero Volt Reference) and a hazard flasher request signal 140. ESC 30 may of course be connected to additional, or different, sources of inputs. The hazard flasher switch signal may come to the ESC 30 over the data link 60 from another controller, or over another type of data bus. The hazard flasher function generally uses the set of turn signal lights 12, 14, 20, 22 from among the exterior marker lights. ESC 30 generates discrete activation signals for each of FETs 55, 56, 57 and 58, although for the flasher hazard function they have synchronized to turn the turn signal lights 12, 14, 20, 22 on and off in a synchronized fashion. This is seen by an observer as the front and rear turn signal lights periodically turning on and off in unison.

Inputs are applied to ESC 30 come from various sources. Important for purposes of the present invention is an engine controller 40 which reports voltage for battery 45, or possibly a more sophisticated estimate of charge state, and the operating status of an engine/generator combination 47. Engine status may be taken as a proxy for Ignition (IGN) switch status, which is shown as applied to the engine controller, but which may be applied to another controller or even directly to ESC 30. The engine controller 40 communicates with ESC 30 over a CAN data link (bus 60) which conforms to the SAE J1939 standard. When the engine/generator combination 47 is on it supplies electricity to battery 45 and vehicle systems such as lights 12, 14, 20 and 22. When the engine/generator combination 47 is off power is sourced from battery 45.

Figure 4:
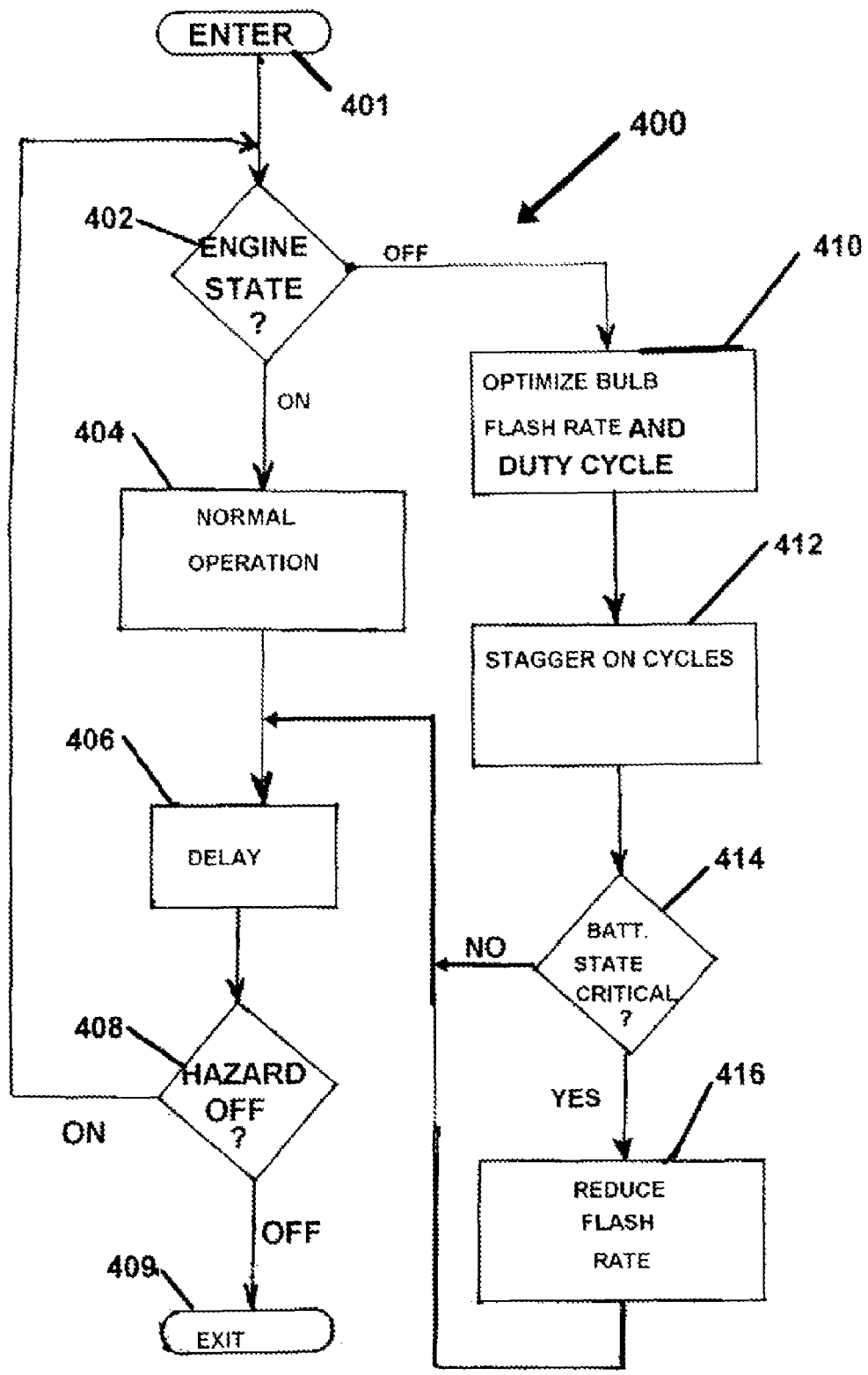
FIG. 4 is a flow chart illustrating operation of the invention.

FIG. 4 is a high level flow chart which illustrates execution of routine 400 implementing the invention. The process is entered at step 401 with activation of the hazard flasher function, typically upon closure of a hazard button by a driver. Next, at step 402, it is determined if the engine is operating and thus that the vehicle is generating electricity to sustain hazard flasher operation of the set of turn signal lights 12, 14, 20, 22. If the engine is on, the ON branch is followed from decision step 402 to operation step 404 which is captioned "Normal Operation". Normal operation means that the bulbs are operated to maximize expected service life since the battery 45 is not supporting hazard flasher operation. It is expected that this will require operating the bulbs at a set operating frequency with the individual light duty cycles set to minimize cooling of the bulbs. In effect, the lights are turned off only long enough to give an observer a clear impression that the lights are flashing thereby minimizing cooling and reducing stress on the bulb filaments associated with the sudden heating occurring when they are turned on. It is possible that the bulbs could be supplied a reduced or trickle current during the "OFF" duty cycle to prevent cool down of the bulbs with the residual current set to produce an impression that the bulb has been extinguished even though in fact it has not. The flasher frequency may be set in the middle of the legally permissible range. Alternatively, it is possible that the flasher operation could be reduced to the lowest allowed frequency of operation to reduce the frequency of cycling the bulbs on and off. Engine and hazard button status are periodically rechecked, as represented by provision of a delay step 406 and a decision step 408 following the normal operation step 404. If the hazard function has been cancelled the OFF branch from step 408 exits the routine. If not, the ON branch is followed back to step 402 where it is determined again if the engine is running.

Decision step 402 also provides an OFF branch provided for occasions when the hazard flasher operation of the turn signal lights 12, 14, 20, 22 has been invoked, but the vehicle engine is not on. The OFF branch leads to an operation box captioned "Optimize Bulb Flash Rate and Duty Cycle" 410. Obviously "optimization" requires selection of criteria to optimize against. With the engine off it is expected that the leading criterion is to conserve battery power, which suggests reducing the flasher frequency to the lowest rate permitted by law and shortening the on duty cycle of the bulbs to the shortest period which will illuminate the bulbs to their design intensity. The present invention contemplates the use of incandescent bulbs for the turn signal lights 12, 14, 20, 22, though the invention is not without application to light emitting diode (LED) systems. Highly efficient LEDs may be used as light fixtures in turn signal applications and it is possible that differing duty cycles and frequencies may be suitable for vehicles so equipped to minimize power usage or to meet other criteria. It is anticipated that LEDs will have expected service lives which outlast the expected service lives of the vehicles in which they are installed, with the result that operating the LEDs to maximize service life may serve little purpose.

Incandescent bulbs exhibit a surge in current demand when initially turned on. This surge is temperature dependent, and is greater the cooler the bulb is. Thus, while it may seem reasonable to reduce operating frequency and the on duty cycle to minimize bulb current demand during four-way flasher operation, it may be beneficial, with some bulbs, and under certain weather conditions, to increase flasher frequency, or shorten the OFF period to prevent the bulbs from cooling. ESC 30 may, as part of its optimization programming monitor the decay of battery charge, and randomly vary the flasher rate (frequency) and the ON duty cycle to see if the introduced random variations have the benefit of slowing the rate of decay of battery charge.

Following optimization step 410, step 412 provides for staggering the activation signals of the turn signal lights 12, 14, 20, 22. In brief, the duty cycles of the turn signal lights 12, 14, 20 and 22 are staggered, resulting in the lights being turned on successively. The brief delay so introduced allows the initial current surge to decay as much as possible before the delay becomes noticeable to an outside observer.

Step 414, following step 412 introduces a determination as to whether the battery state of charge has become critical, here defined as a state of charge which is unable to sustain the legally required flasher frequency and intensity. If this has occurred, the YES branch follows step 414 to step 416. At step

416 the operational frequency is reduced to whatever rate is needed to allow the battery to recover to the extent it can recover to support periodic illumination of the bulbs at a useful intensity. It is also possible that with a further decline in the battery state of charge, duty cycles for front turn signals could be terminated as part of hazard flasher operation with illumination limited to the rear turn signal lights 20, 22 if insufficient current can be sourced from battery 45 to sufficiently illuminate four-way hazard flashing. From step 416, or along the NO branch from step 414, execution is returned to step 406 and following as described above. For an electric vehicle steps 402 and 404 may be disregarded, since battery charge conservation will be the primary consideration.

Figure 5:
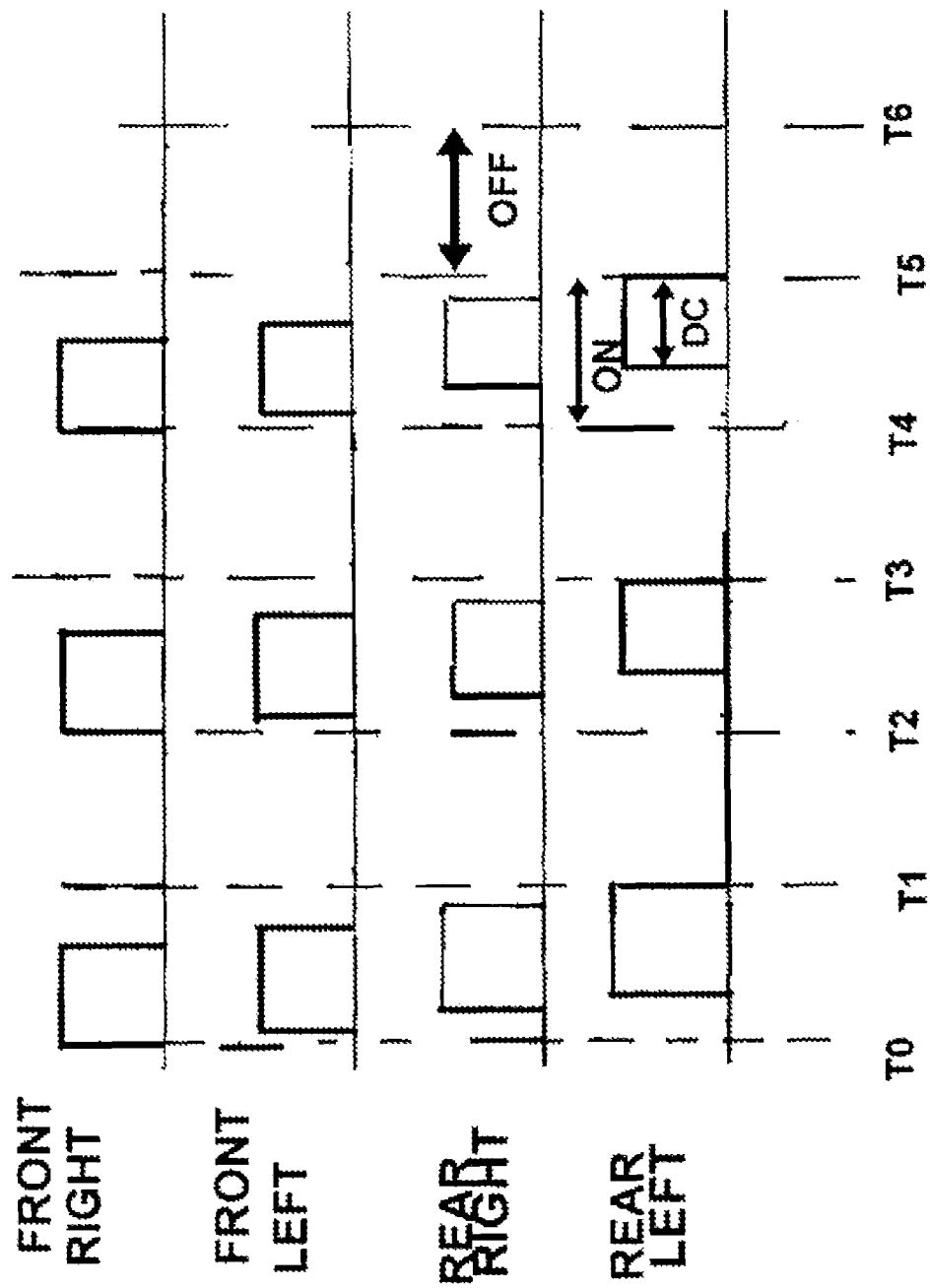
FIG. 5 is a timing diagram illustrating operation of vehicle lights in implementing the invention.

Referring to FIG. 5 a timing chart illustrates aspects of the invention. The frequency of operation is set by the cycle duration. Each cycle comprises two time periods, e.g., T2 to T3 and T3 to T4. The lights are on for a portion of one time period and off in the other (excluding the possibility of a residual current). The periods, though shown to be equal in duration need not be of equal duration. For example, the OFF period may be shortened relative to the period including ON pulses to reduce temperature decay of the filaments of the bulbs. The total duration of the duty cycles may be adjusted as required to either minimize total current drawn or to maintain an even filament temperature to promote long service life. The OFF period is simply a period when all bulbs are concurrently extinguished (or operated at a much lower intensity) which is of sufficient duration to be noticed by an observer. The "ON" period is the portion of the cycle which contains all of the staggered duty cycles for one flasher cycle.

The duty cycle (DC) for each bulb comprises a portion of the ON period of a cycle. Lead acid battery charge is drained more quickly by imposing high peak loads on the battery even where the total cumulative current drawn is fixed. Thus the duty cycles are staggered, with the bulbs being turned on successively to reduce peak load on the battery when the engine is not on and cannot support battery charging. The degree to which duty cycles may be staggered is limited only by the need to avoid the staggering becoming visible to an observer.

While the invention is shown in only one of its forms, it is not thus limited but is susceptible to various changes and modifications without departing from the spirit and scope of the invention.

What is claimed is:

1. A vehicle comprising:
   a first hazard warning light, a second hazard warning light, a third hazard warning light, and a fourth hazard warning light, each of the first, second, third, and fourth hazard warning lights being mounted to be visible on a different exterior corner of the vehicle;
   a vehicle battery for supplying electrical power to the first, second, third, and fourth hazard warning lights;
   a first hazard warning light switch connected to the first hazard warning light, a second hazard warning light switch connected to the second hazard warning light, a third hazard warning light switch connected to the third hazard warning light, and a fourth hazard warning light switch connected to the fourth hazard warning light; and
   a controller for the first, second, third, and fourth hazard warning light switches, each of the first, second, third, and fourth hazard warning light switches being independently controlled by the controller, the controller enabling operation of the first, second, third, and fourth hazard warning lights in a hazard flashing mode where the first, second, third, and fourth hazard warning lights appear to flash on and off in synchronization, the controller providing for optimizing the operating frequency, duty cycle, and timing of the warning lights;
   the controller further providing for extending the life of the vehicle battery by sequentially turning on each of the first, second, third, and fourth hazard warning light switches during each flash of the hazard flashing mode, the sequential turning on of each of the first, second, third, and fourth hazard warning lights occurring within a period not readily perceived visually; the sequential turning on of each of the first, second third and forth hazard warning lights further occurring over a period calculated to minimize the cumulative inrush current.

2. The vehicle according to claim 1, further comprising:
   an engine and generator combination for recharging the vehicle battery; and
   the controller being responsive to the engine being on by optimizing the duty cycle and operating frequency of the first, second, third, and fourth hazard warning lights in the hazard flashing mode in a manner calculated to extend expected first, second, third, and fourth hazard warning light service life.

3. The vehicle according to claim 2, wherein the controller optimizes the duty cycle and operating frequency of the first, second, third, and fourth hazard warning light to extend the expected first, second, third, and fourth hazard warning light service life by lengthening the time when each of the first, second, third, and fourth hazard warning lights are on, and shortening the length of time when each of the first, second, third, and fourth hazard lights are off, consistent with producing a visually perceptible period during which the first, second, third, and fourth hazard warning lights appear extinguished.

4. The vehicle according to claim 1, further comprising:
   the controller providing for sequentially turning on each of the first, second, third, and fourth hazard warning light switches during each flash of the hazard flashing mode responsive to an unavailability of vehicle generated power.

5. The vehicle according to claim 1, further comprising:
   the controller being further responsive to charge on the vehicle battery declining below at least a first critical threshold by reducing the operating frequency of the first, second, third, and fourth hazard warning lights in the hazard flashing mode as required to maintain visible flashing.

6. The vehicle according to claim 5, further comprising:
   the controller being further responsive to a charge on the vehicle battery declining below a lower threshold than the first critical threshold by shedding at least one of the first, second, third, and fourth hazard warning lights from the hazard flashing mode.

7. A hazard warning system for a motor vehicle comprising:
   a first hazard warning light, a second hazard warning light, a third hazard warning light, and a fourth hazard warning light, each of the first, second, third, and fourth hazard warning lights being adapted to be mounted on a different exterior corner of the motor vehicle;
   a vehicle battery for supplying electrical power to the first, second, third, and fourth hazard warning light;
   a first hazard warning light switch connected to the first hazard warning light, a second hazard warning light switch connected to the second hazard warning light, a third hazard warning light switch connected to the third hazard warning light, and a fourth hazard warning light switch connected to the fourth hazard warning light;

a controller for each of the first, second, third, and fourth hazard warning light switches, each of the first, second, third, and fourth hazard warning light switches being independently controlled by the controller;

the controller providing operation of the first, second, third, and fourth hazard warning lights in a hazard flasher mode wherein the first, second, third, and fourth hazard warning lights appear to an observer to flash on and off concurrently;

the controller in hazard flasher mode providing periods when each of the first, second, third, and fourth hazard warning lights is on and off, the duty cycle, the operating frequency, and timing of the first, second, third, and fourth hazard warning lights being adjusted to conserve battery charge without interrupting hazard flasher mode operation; and an engine and generator combination for recharging the vehicle battery;

the controller providing for sequentially turning on each of the first, second, third, and fourth hazard warning light switches during each flash of the hazard flashing mode responsive to an unavailability of vehicle generated power; the sequential turning on of each of the first, second, third, and fourth hazard warning lights further occurring over a period calculated to minimize the cumulative inrush current.

8. A hazard warning system for a motor vehicle according to claim 7, the hazard warning system further comprising:

the controller being further responsive to a charge on the vehicle battery declining below at least a first critical threshold by reducing the operating frequency of the first, second, third, and fourth hazard warning lights in the hazard flashing mode as required to maintain visible flashing.

9. A hazard warning system for a motor vehicle according to claim 8, the hazard warning system further comprising:

the controller being further responsive to a charge on the vehicle battery declining below a lower threshold than the first critical threshold by shedding at least one of the first, second, third, and fourth hazard warning lights from the hazard flashing mode.

* * * * *